(12) United States Patent
Severin et al.

(10) Patent No.: US 8,895,867 B2
(45) Date of Patent: Nov. 25, 2014

(54) ARRANGEMENT COMPRISING A CARRIER AND A LAYER

(75) Inventors: Nikolai Severin, Berlin (DE); Martin Dorn, Berlin (DE); Jürgen Rabe, Berlin (DE)

(73) Assignee: Humboldt-Universitaet zu Berlin, Berlin (DE)

( * ) Notice: Subject to any disclaimer, the term of this patent is extended or adjusted under 35 U.S.C. 154(b) by 289 days.

(21) Appl. No.: 13/511,841

(22) PCT Filed: Nov. 22, 2010

(86) PCT No.: PCT/DE2010/050084
§ 371 (c)(1),
(2), (4) Date: May 24, 2012

(87) PCT Pub. No.: WO2011/063802
PCT Pub. Date: Jun. 3, 2011

(65) Prior Publication Data
US 2012/0279773 A1    Nov. 8, 2012

(30) Foreign Application Priority Data
Nov. 26, 2009   (DE) .......................... 10 2009 056 052

(51) Int. Cl.
| | | |
|---|---|---|
| *H05K 1/03* | (2006.01) | |
| *H01G 11/38* | (2013.01) | |
| *B82Y 30/00* | (2011.01) | |
| *H01G 11/36* | (2013.01) | |
| *H01G 9/04* | (2006.01) | |

(52) U.S. Cl.
CPC ................ *B82Y 30/00* (2013.01); *Y02E 60/13* (2013.01); *H01G 11/38* (2013.01); *H01G 11/36* (2013.01); *H01G 9/058* (2013.01)
USPC ........... 174/256; 174/257; 428/367; 428/688; 429/207; 429/409; 257/9; 257/28; 257/29; 257/324; 257/632; 257/750

(58) Field of Classification Search
USPC ........... 174/256, 257; 428/367, 688; 429/207, 429/409; 257/9, 28, 29, 324, 632, 750
See application file for complete search history.

(56) References Cited

U.S. PATENT DOCUMENTS

| | | | |
|---|---|---|---|
| 8,106,383 B2 * | 1/2012 | Jenkins et al. | ................... 257/29 |
| 8,193,455 B2 * | 6/2012 | Marinero | ...................... 174/257 |

(Continued)

FOREIGN PATENT DOCUMENTS

| | | |
|---|---|---|
| DE | 10 2007 016 995 A1 | 10/2008 |
| JP | 7202157 | 8/1995 |

(Continued)

OTHER PUBLICATIONS

Alfonso Reina et al., "Large Area, Few-Layer Graphene Films on Arbitrary Substrates by Chemical Vapor Deposition", Nano Letters 2009, vol. 9, No. 1, pp. 30-35.

(Continued)

*Primary Examiner* — Xiaoliang Chen
(74) *Attorney, Agent, or Firm* — Foley & Lardner LLP (57) ABSTRACT

The invention relates inter alia to an arrangement comprising a carrier (10), a layer and a material (20) enclosed between the carrier and the layer.
According to the invention, it is provided that the layer is formed by a single two-dimensionally crosslinked layer (40) or by a plurality of two-dimensionally crosslinked layers which are indirectly or directly connected to one another.

15 Claims, 9 Drawing Sheets

(56) References Cited

U.S. PATENT DOCUMENTS

| | | | |
|---|---|---|---|
| 2006/0062713 A1* | 3/2006 | Sano et al. | 423/445 R |
| 2007/0137786 A1* | 6/2007 | Luzzi | 156/304.1 |
| 2007/0212538 A1* | 9/2007 | Niu | 428/367 |
| 2008/0268318 A1 | 10/2008 | Jang et al. | |
| 2008/0280169 A1* | 11/2008 | Niu et al. | 429/13 |
| 2009/0059474 A1 | 3/2009 | Zhamu et al. | |
| 2009/0072192 A1 | 3/2009 | Seal et al. | |
| 2009/0079040 A1* | 3/2009 | Schultz et al. | 257/632 |
| 2009/0101964 A1* | 4/2009 | Choi et al. | 257/324 |
| 2009/0169919 A1* | 7/2009 | Garcia et al. | 428/688 |
| 2009/0174435 A1* | 7/2009 | Stan et al. | 326/112 |
| 2009/0177273 A1* | 7/2009 | Piveteau et al. | 623/1.46 |
| 2009/0246625 A1* | 10/2009 | Lu | 429/207 |
| 2010/0021708 A1 | 1/2010 | Kong et al. | |
| 2010/0051897 A1* | 3/2010 | Chen et al. | 257/9 |
| 2010/0143726 A1 | 6/2010 | Golzhauser et al. | |
| 2010/0163285 A1* | 7/2010 | Marinero | 174/257 |
| 2010/0320437 A1* | 12/2010 | Gordon et al. | 257/9 |
| 2011/0006425 A1* | 1/2011 | Wada et al. | 257/750 |
| 2011/0101309 A1* | 5/2011 | Lin et al. | 257/29 |
| 2011/0108521 A1* | 5/2011 | Woo et al. | 216/36 |
| 2011/0114919 A1* | 5/2011 | Jenkins et al. | 257/29 |
| 2011/0163290 A1* | 7/2011 | Rueckes et al. | 257/9 |
| 2012/0085991 A1* | 4/2012 | Cohen et al. | 257/28 |

FOREIGN PATENT DOCUMENTS

| | | |
|---|---|---|
| WO | WO 2009/123771 A2 | 10/2009 |
| WO | WO 2009/129194 A2 | 10/2009 |

OTHER PUBLICATIONS

Avinash J. Patil et al., "Aqueous Stabilization and Self-Assembly of Graphene Sheets into Layered Bio-Nanocomposites using DNA", Adv. Mater. 2009, 21, 3159-3164.

* cited by examiner

ARRANGEMENT COMPRISING A CARRIER AND A LAYER

The invention relates to an arrangement comprising a carrier, a layer and a material enclosed between the carrier and the layer.

The invention is based on the object of specifying an arrangement with which materials can be reliably and permanently enclosed or protected and also changed in terms of their distribution.

This object is achieved according to the invention by an arrangement having the features as claimed in patent claim 1. Advantageous configurations of the arrangement according to the invention are specified in dependent claims.

Accordingly, it is provided according to the invention that the layer is formed by a single two-dimensionally crosslinked layer or by a plurality of two-dimensionally crosslinked layers which are indirectly or directly connected to one another.

A significant advantage of the arrangement according to the invention is that two-dimensionally crosslinked layers are very thin but nevertheless stable. In addition, depending on the material, two-dimensionally crosslinked layers have outstanding properties, which can differ considerably from three-dimensional crystals having the same composition, for example. By way of example, two-dimensionally crosslinked layers can be very ductile and at the same time very impermeable to other materials, or else can be optically transparent and at the same time have good electrical conductivity.

A further significant advantage of the arrangement according to the invention is that the smallest amounts of material, such as liquids in the sub-zeptoliter range, single molecules, cells and the like, can also be enclosed permanently and reliably using two-dimensionally crosslinked layers. The enclosure of such materials can serve, for example, for locally fixing the latter on the carrier, in order to make subsequent examination of the material possible or to simplify it.

The two-dimensionally crosslinked layer or the two-dimensionally crosslinked layers are preferably impermeable to gases and liquids, are thinner than 10 atom layers and/or are atomically smooth. Here, the term "atomically smooth" is understood to mean a fluctuation in layer thickness of at most ±1 atom layer.

By way of example, the enclosed material can comprise biological material or consist thereof. The enclosed biological material preferably comprises biomolecules (e.g. RNA, DNA), cells, viruses, bacteria, spores and/or prions or consists thereof.

The two-dimensionally crosslinked layer(s) used is preferably a two-dimensional crystal layer. The two-dimensional crystal layer is preferably an atomic crystal layer, in the simplest case a crystal layer consisting of only one chemical element.

The two-dimensionally crosslinked layer or the two-dimensionally crosslinked layers are preferably electrically conductive and/or impermeable to gases and liquids, for example to oxygen, moisture and/or water.

The surface of the carrier is preferably smooth on an atomic scale or atomically smooth. Here, the term "smooth on an atomic scale" or "atomically smooth" is understood to mean a fluctuation in layer thickness of at most ±1 atom layer.

In a particularly advantageous configuration of the arrangement, the two-dimensionally crosslinked layer is a graphene layer or a graphene-like layer or the two-dimensionally crosslinked layers are graphene layers or graphene-like layers. A graphene layer is a two-dimensional, hexagonal carbon crystal layer and is particularly suitable for enclosing material on a carrier or for protecting a material against external influences (for example water, moisture, gas): thus, graphene is very ductile, up to at least 20% in all directions in the plane, and is impermeable even to particularly volatile materials, for example gaseous helium. Using a graphene layer, a multiplicity of different materials can therefore be fixed reliably and permanently on a carrier and/or protected against external influences. In addition, graphene is very pressure-resistant, and therefore escape of the enclosed material and/or damage to the graphene layer is reliably avoided even under high mechanical loading.

Another example is graphene oxide, which is not homogeneously crystalline but has a two-dimensional crosslinked layer.

By way of example, the enclosed material can comprise a liquid or consist thereof. Examples of suitable liquids are, inter alia, liquids which contain acetone, methanol, chloroform and/or water.

In the case of small quantities of liquid, liquid molecular layers will advantageously form between the two-dimensionally crosslinked layer and the carrier, such that fluctuations in the thickness of the enclosed liquid layer lead to the formation of steps in the two-dimensionally crosslinked layer; in this case, the step height corresponds to a multiple of the thickness of a liquid single molecular layer. In other words, the two-dimensionally crosslinked layer will therefore adapt to the height profile of the enclosed liquid and be locally stretched in an appropriate manner. This makes it possible, for example, to measure the thickness of molecular layers of liquids, for example using an atomic force microscope.

It is also possible for the enclosed material to comprise optically or electronically active materials or to consist thereof. By way of example, the enclosed material can comprise optically or electronically active polymers or consist thereof. The enclosed material is preferably protected by the crosslinked layers.

The surface of the carrier can be rough or smooth. It is considered to be particularly advantageous, however, if the surface is formed by a monoclinic silicate layer. In technical terminology, a monoclinic silicate surface is also referred to as a mica surface (Latin: micare=shine, sparkle, glimmer), since it has an above-average smoothness and has corresponding mechanical and optical properties.

It is preferable for the carrier surface to consist of a monoclinic silicate layer which can be described by the following chemical structural formula:

$$X_2Y_{4-6}Z_8O_{20}(OH,F)_4$$

where
X is a place holder for K, Na, Ca, Ba, Rb or Cs,
Y is a place holder for Al, Mg, Fe, Mn, Cr, Ti or Li, and
Z is a place holder for Si, Al, $Fe^{3+}$ or Ti.

The advantage of a monoclinic silicate carrier layer is that, on account of its high smoothness, it promotes the stratification of an enclosed liquid in the form of liquid single molecular layers between the two-dimensionally crosslinked layer and the carrier surface.

Alternatively, the surface can also be structured, e.g. locally roughened, in order to predetermine a structured material distribution, in particular liquid distribution, on the carrier surface or to promote it.

The amount of material enclosed can—for example for analytical purposes—be very small. Even volumes in the sub-zeptoliter range (volumes $\leq 10^{-21}$ l) can be fixed on the carrier using a two-dimensionally crosslinked layer. The layer can protect the enclosed material in a gastight manner, for example in order to prevent fading of fluorescence.

The enclosed material can also form a component part of an optical or electronic component, for example of a sensor.

The arrangement preferably comprises a manipulation device, which is suitable for acting on the carrier, the layer and/or the material enclosed between the carrier and the layer, preferably mechanically, electromagnetically, thermally and/or chemically. It is preferable for the manipulation device to be suitable for joining material portions which are separate from one another and are enclosed between the carrier and the layer and for forming a cohesive material portion using the material portions which are separate from one another, and/or to be suitable for separating a cohesive material portion which is enclosed between the carrier and the layer. By way of example, the arrangement can form a pump or a component part of a pump.

By way of example, the arrangement can form a fluid component, for example in the form of a pump. It is preferable for such a fluid component to comprise particularly small volumes of liquid, preferably in the zeptoliter range or in the sub-zeptoliter range.

Moreover, it is considered to be advantageous if the arrangement comprises a capacitor structure with at least two capacitor areas, of which one is formed by the two-dimensionally crosslinked layer or by at least one of the two-dimensionally crosslinked layers. By applying an electrical voltage to the electrode structure, mechanical forces can be generated in a very simple manner and the two-dimensionally crosslinked layer can be deformed, such that a local increase in pressure can occur.

In the case of fluid components, a local increase in pressure can be used, for example, to achieve a pump function. In such a case, it is preferable for an inflow channel and/or outflow channel to be connected to the volume in which the material or the liquid is enclosed, in order to allow the liquid to be passed on and/or drained.

In other words, the arrangement can therefore form a pump, for example, which is operated by electrical activation. Alternatively and/or in addition, other types of activation can also be provided, for example on the basis of mechanically and/or inductively operating devices.

As an alternative to and/or in addition to liquids, other materials can also be enclosed between the carrier and the two-dimensionally crosslinked layer, for example solid materials such as nanoparticles, micrometer-sized particles, single molecules and/or polymer material.

The enclosure of biological material can serve, for example, to fix the latter locally on the carrier so as to be able to carry out subsequent meteorological investigations. As biological material, it is possible for blood cells, viruses, bacteria or the like to be fixed on the carrier, for example.

The enclosed material can also be an optically active material, for example. By way of example, an optically active material makes it possible to produce optically active components such as light-emitting diodes, e.g. organic light-emitting diodes, or the like.

Other optical components can also be produced with the arrangement. By way of example, nanoparticles or micrometer-sized particles can be used to form grating structures or the like. The optical components are preferably realized on the basis of a graphene crystal layer, since graphene is largely optically transparent for electromagnetic waves, in particular light waves. The electromagnetic waves are therefore influenced primarily or exclusively by the material enclosed between the carrier and the graphene layer.

In addition, it is possible to influence electromagnetic waves or to influence electrons or electron beams by forming the surface of the two-dimensionally crosslinked layer with fluting; by way of example, fluting can conduct, diffract, scatter or reflect electromagnetic waves and/or electron beams.

Provision can also be made for polymer material to be enclosed between the carrier and the two-dimensionally crosslinked layer, in order to protect said material against external influences such as moisture or water. Optically active polymer materials in particular, such as those used in organic light-emitting diodes (LEDs), are very sensitive to external influences. Accordingly, it is considered to be advantageous if a two-dimensionally crosslinked layer is used as a protective layer for protecting an organic polymer material, in particular for protecting organic light-emitting diodes. Two-dimensionally crosslinked layers are advantageous as protective layers particularly because they are flexible—for example as compared with rigid glass layers—and relatively inexpensive—as compared with known ITO (indium tin oxide) material. The invention is therefore also considered to relate to an arrangement comprising an organic light-emitting diode in which the organic, optically active material is enclosed between a carrier and a two-dimensionally crosslinked layer.

The invention additionally relates to a method for producing an arrangement, in which method a layer is applied to a carrier, wherein material is enclosed between the layer and the carrier at least in parts.

According to the invention, it is provided with respect to such a method that the layer is formed with at least one two-dimensionally crosslinked layer.

Concerning the advantages of the method according to the invention, reference is made to the statements made above in connection with the arrangement according to the invention, since the advantages of the arrangement according to the invention substantially correspond to those of the method according to the invention.

It is considered to be advantageous if the distribution of the material is changed, for example by means of the action of a mechanical, an electrostatic and/or magnetic force, after it has been enclosed between the carrier and the at least one two-dimensionally crosslinked layer.

The distribution can be changed in a particularly simple and therefore advantageous manner with the aid of a tip, which is placed onto the two-dimensionally crosslinked layer. This is preferably a shaped tip as is used or at least would be usable in atomic force microscopes as an atomic force microscope tip.

By changing the distribution of the material between the two-dimensionally crosslinked layer and the carrier, it is also possible to produce desired structures after the material has been enclosed between the carrier and the two-dimensionally crosslinked layer. It is also possible to repeatedly change the distribution of the material, i.e. to carry out for example "writing processes" and "erasing processes" in relation to the structure and the material distribution between the carrier and the two-dimensionally crosslinked layer. In the manner described, it is possible, for example, to mechanically store information by inscribing the latter into the material between the carrier and the two-dimensionally crosslinked layer. The arrangement comprising the carrier, the layer and the material enclosed therebetween can therefore also form a mechanical storage device for storing information.

On account of the high stability of the two-dimensionally crosslinked layer, the wear which occurs when the information is being erased and written is relatively low, and therefore the number of writing and erasing operations is sufficiently high for technically relevant requirements.

The distribution of the material between the carrier and the two-dimensionally crosslinked layer can additionally be changed in order to "stamp" predefined material structures, for example channels, into the arrangement. Such a stamping technique can be advantageous particularly when fluid components or optical components, as have already been mentioned in the introduction, are to be produced.

If the material distribution between the two-dimensionally crosslinked layer and the carrier is fixed and is not subsequently to be changed, it is considered to be advantageous if, before the material to be enclosed is applied, the surface of the carrier is locally changed or structured and/or functionalized, for example by roughening, etching or some other surface treatment. The material to be enclosed will generally be distributed on the carrier in such a manner that it remains lying on the roughened surface portions, such that it also remains there during the subsequent enclosure with the two-dimensionally crosslinked layer, and enclosed material regions form at the desired locations.

In addition, the invention relates to a method for operating an arrangement comprising a manipulation device, characterized in that the manipulation device is used to join material portions which are separate from one another and are enclosed between the carrier and the layer and to form a cohesive material portion using the material portions which are separate from one another and/or to separate a cohesive material portion which is enclosed between the carrier and the layer.

The invention is explained in more detail hereinbelow on the basis of exemplary embodiments; by way of example.

In the figures, the same reference symbols are always used for comparable or identical components for reasons of clarity.

Figure 1:
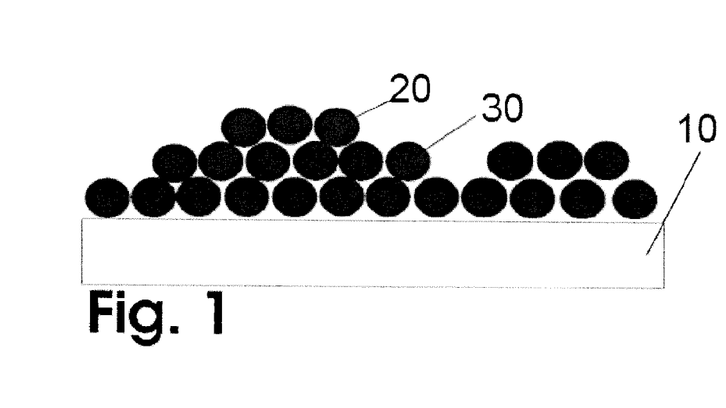
FIGS. 1-4 show a method for producing an exemplary embodiment of an arrangement according to the invention.

FIG. 1 shows a carrier 10, on which there lies material 20 in the form of a liquid. The liquid molecules are denoted by the reference symbol 30.

Figure 2:
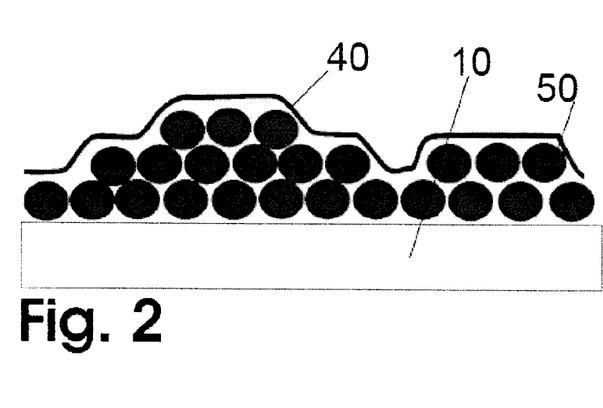

FIG. 2 shows the carrier 10 with the material 20 after a two-dimensionally crosslinked layer 40 has been applied to the material 20 and the carrier 10. The two-dimensionally crosslinked layer 40 is preferably a graphene layer.

It can be seen in FIG. 2 that the two-dimensionally crosslinked layer 40 adapts to the height profile of the liquid, such that the surface profile of the two-dimensionally crosslinked layer 40 follows the fluctuations in thickness of the enclosed liquid and steps are formed, the step height of which corresponds to a multiple of the thickness of a liquid single molecular layer 50.

Figure 3:
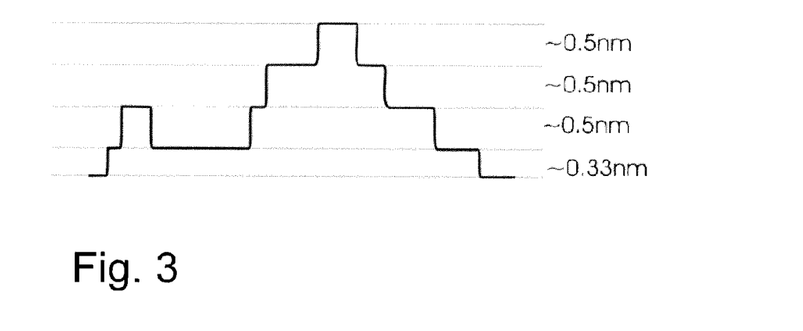

FIG. 3 shows, by way of example, a height profile measured using an atomic force microscope, for the case where acetone is enclosed between the carrier and a graphene layer. It can be seen that the thickness of the liquid single molecular layers is about 0.5 nm and the thickness of the two-dimensionally crosslinked graphene layer is about 0.33 nm.

Figure 4:
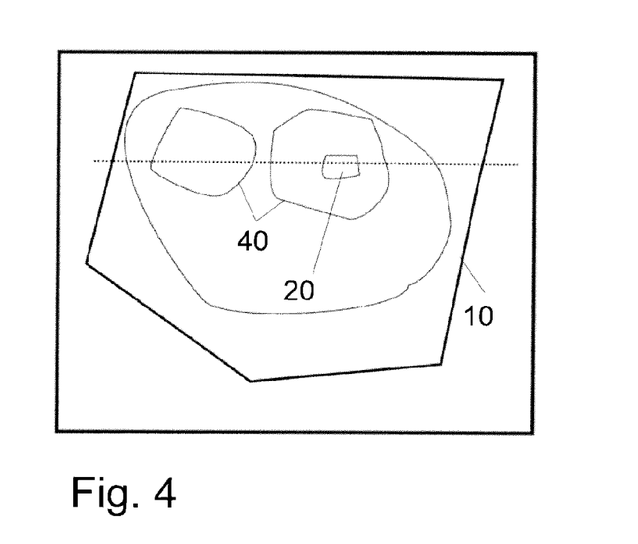

FIG. 4 shows the carrier 10 with the two-dimensionally crosslinked layer 40 and the material 20 (liquid) enclosed locally therebetween in a plan view. The surface of the carrier 10 is preferably formed by a monoclinic silicate surface, since such a surface is very smooth and the liquid can be distributed very well thereon.

Figure 5:
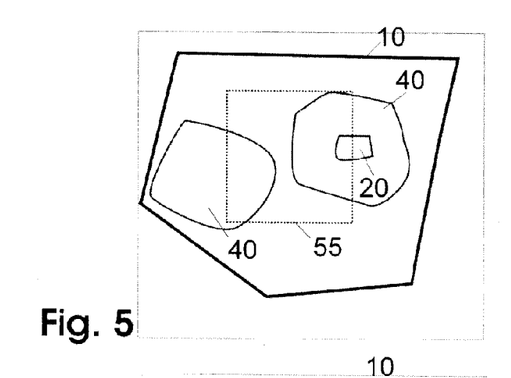
FIGS. 5-8 show the changing of the material distribution between a carrier and a two-dimensionally crosslinked layer using a tip.

FIG. 5 shows the carrier 10 shown in FIG. 4, before the distribution of the material 20 in the region within the contour 55 and also the arrangement of the two-dimensionally crosslinked layer 40 are changed electrically, magnetically and/or mechanically.

Figure 6:
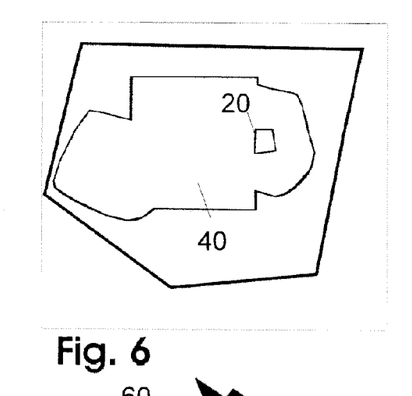

FIG. 6 shows, by way of example, the resulting structure, after the material 20 has been pressed out of the region within the contour 55 and said region is free of material.

Figure 7:
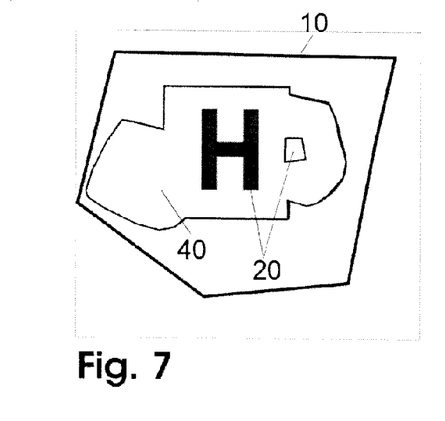

FIG. 7 shows, by way of example, a different structure, after a pattern consisting of two parallel bars and a bar perpendicular thereto has been formed with the material 20 within the contour 55.

Figure 8:
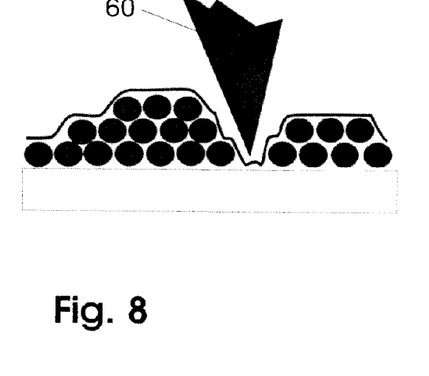

The material 20 can be displaced underneath the two-dimensionally crosslinked layer 40 mechanically in a simple manner, for example using a tip 60. FIG. 8 shows such a tip by way of example.

Figure 9:
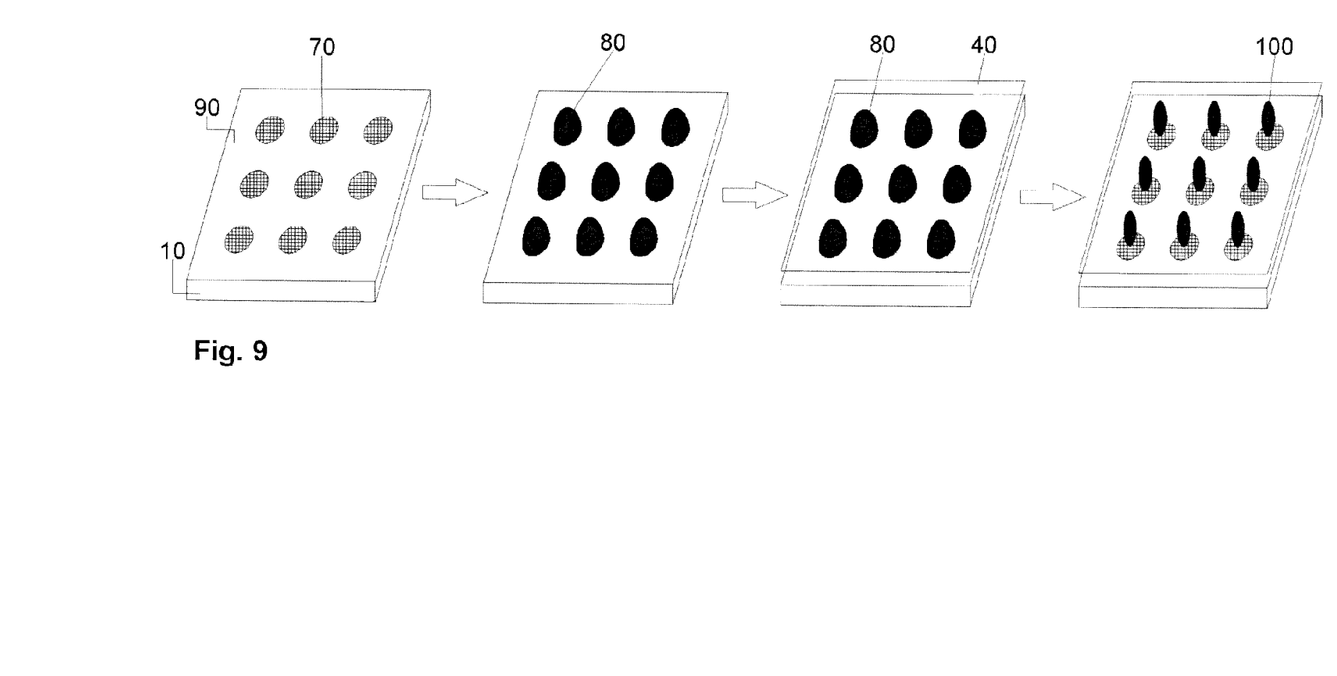
FIG. 9 shows a method for producing nanoparticles with the aid of liquid drops.

FIG. 9 shows, by way of example, the production of an arrangement in which the surface 90 of the carrier 10 is firstly structured, e.g. locally roughened (cf. first image from the left). On account of this structuring, a structured material distribution, in particular liquid distribution, will arise on the carrier surface. The second image from the left shows liquid drops 80, which collect on the roughened portions 70 of the carrier.

The third image from the left shows the liquid drops 80 after they have been covered with a two-dimensionally crosslinked layer 40.

The arrangement shown in the third image can then be reworked, for example chemically. If the liquid drops 80 are hardened, for example, nanoparticles can be formed, depending on the amount of liquid in the enclosed liquid drops 80, for example. Such nanoparticles are denoted by the reference symbol 100 in the fourth image from the left.

Figure 10:
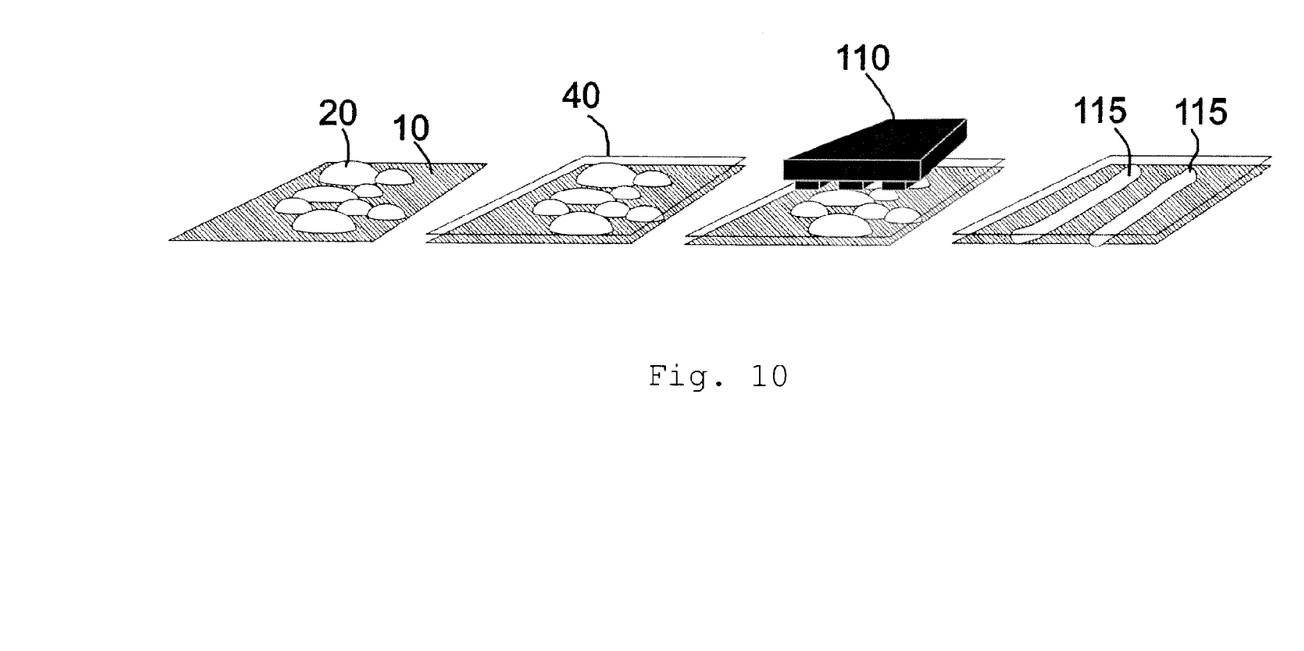
FIG. 10 shows a method for stamping a liquid structure underneath a two-dimensionally crosslinked layer.

FIG. 10 shows, by way of example, how a predefined or desired distribution of the material 20 under the two-dimensionally crosslinked layer 40 can be modified with the aid of a mechanical pressing device, for example a stamp 110.

It can be seen that bar-like structures 115, for example, can be stamped.

Figure 11:
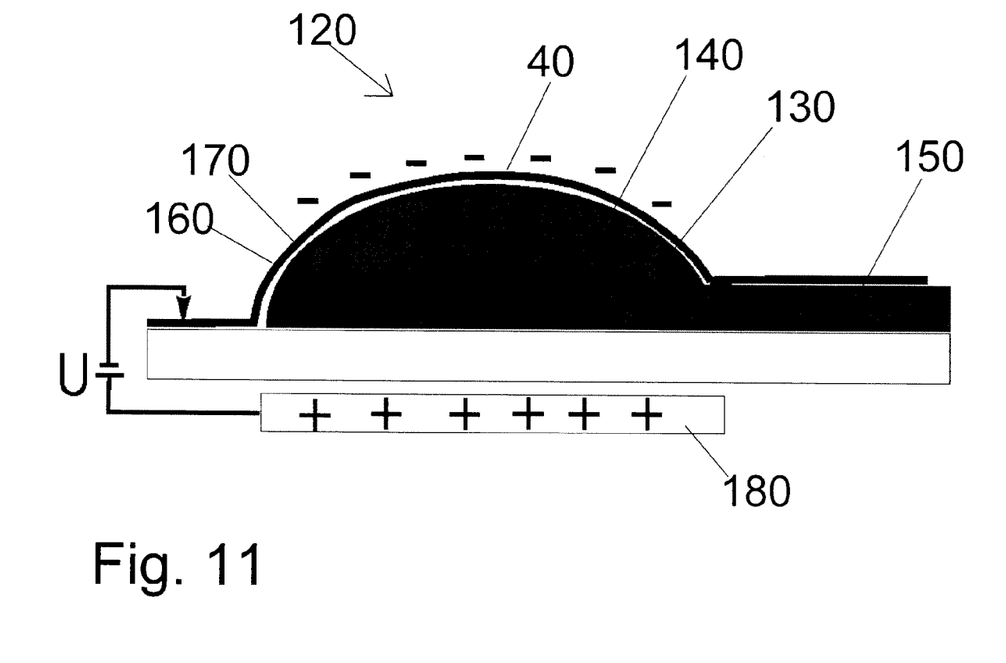
FIG. 11 shows an exemplary embodiment for an arrangement according to the invention which forms a fluid component with a capacitor structure.

FIG. 11 shows an exemplary embodiment for an arrangement which forms a fluid component 120. The fluid component 120 comprises a receiving portion 130 with a liquid 140, the volume of which lies, for example, in the zeptoliter range or in the sub-zeptoliter range. The receiving portion 130 is adjoined by a channel 150, into which the liquid 140 is pressed when the receiving portion 130 is compressed.

FIG. 11 additionally shows a capacitor or electrode structure 160 with at least two capacitor areas 170 and 180, of which one is formed by the two-dimensionally crosslinked layer 40. By applying an electrical voltage U to the capacitor or electrode structure 160, mechanical compressive forces can be generated and the two-dimensionally crosslinked layer 40 can be deformed, resulting in a local increase in pressure and in a flow of liquid into the channel 150. The arrangement shown in FIG. 11 can therefore form a pump or a component part of a pump.

Figure 12:
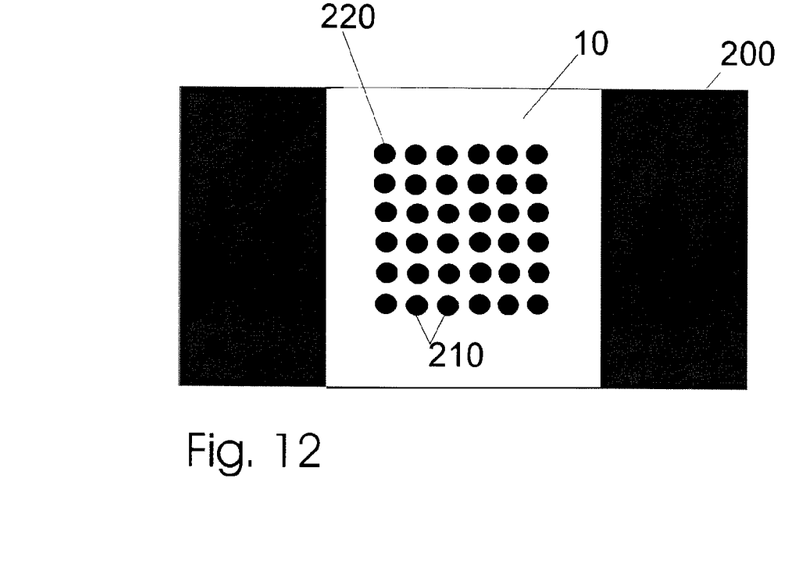
FIG. 12 shows an exemplary embodiment for an arrangement according to the invention which forms an optical component with an optical grating.

FIG. 12 shows, by way of example, an exemplary embodiment for an arrangement which forms an optical component 200. Nanoparticles or micrometer-sized particles 210 are arranged in a matrix by means of a two-dimensionally crosslinked layer 40 such that they form an optical grating 220. The particles 210 are preferably particles of a conductive, for example metallic, material, for example gold. Since graphene is largely optically transparent for electromagnetic waves, in particular light waves, the two-dimensionally crosslinked layer 40 is preferably produced from such a material or a comparable material.

Figure 13:
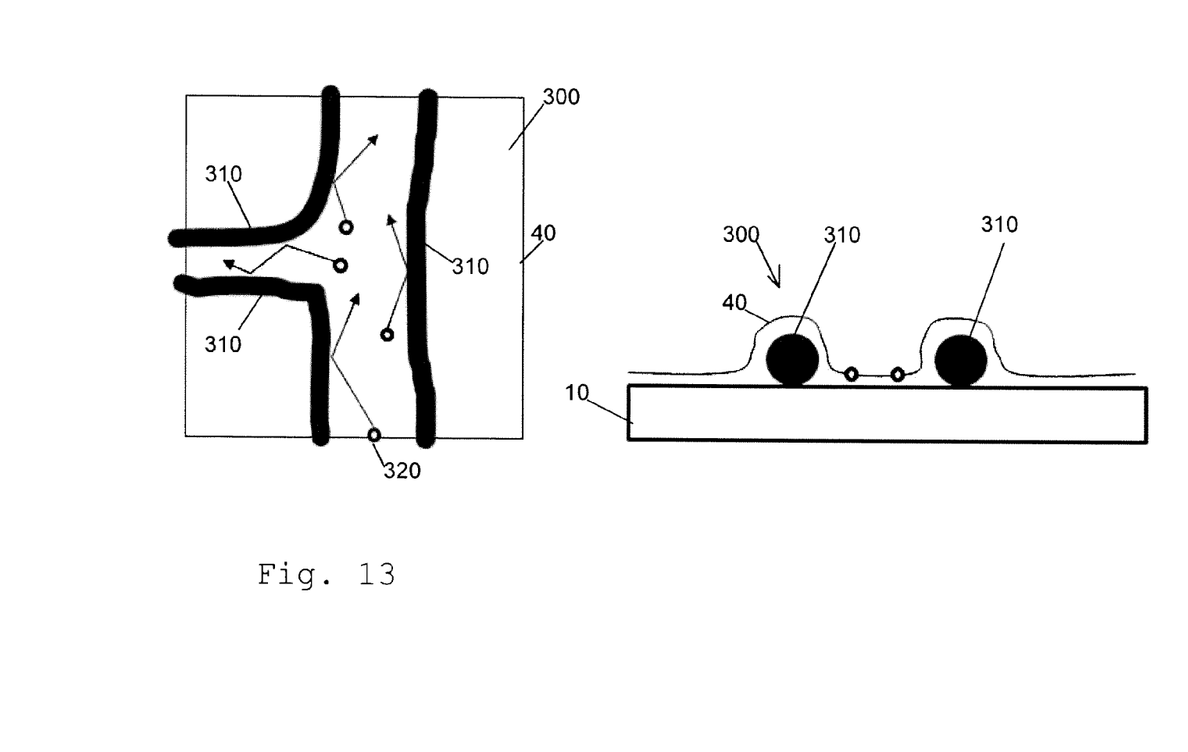
FIG. 13 shows an exemplary embodiment for an arrangement according to the invention in which enclosed polymer molecules support directional electron conduction.

FIG. 13 shows, by way of example, an arrangement 300 in which polymer molecules 310 are enclosed in a linear or bar-like form between the carrier 10 and the two-dimensionally crosslinked layer 40. By way of example, the polymer molecules 310 can form a potential barrier for the electrons 320 which can move in the two-dimensionally crosslinked layer, and therefore enclose a quasi-two-dimensional electron gas, as denoted by arrows in FIG. 13.

Figure 14:
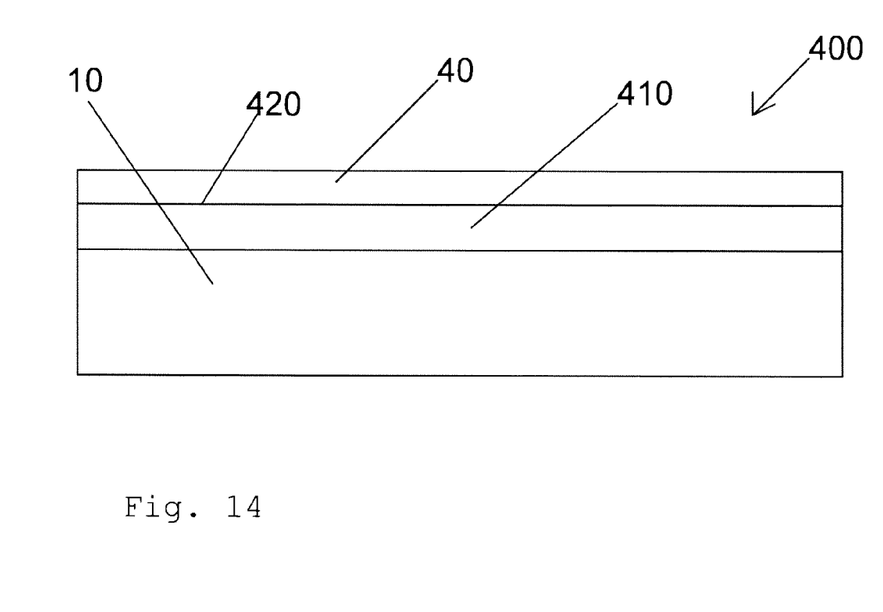
FIG. 14 shows an exemplary embodiment for an arrangement according to the invention which forms a screen on the basis of organic or inorganic light-emitting diodes.

FIG. 14 shows an exemplary embodiment for an arrangement 400 in which polymer material 410 is enclosed between the carrier 10 and the two-dimensionally crosslinked layer 40 in order to protect said material against external influences such as moisture or water. The polymer material 410 preferably forms optically active material of one or more organic or inorganic light-emitting diodes (not shown in further detail). In this case, the carrier 10 can bear, for example, the electrical connections and also further components for the activation of the organic or inorganic light-emitting diode(s). The arrangement 400 preferably forms a display device or a screen, the outer surface 420 of which is protected by the two-dimensionally crosslinked layer 40.

REFERENCE SYMBOLS

10 Carrier
20 Material
30 Liquid molecule
40 Two-dimensionally crosslinked layer
50 Single molecular layer
55 Contour
60 Tip
70 Roughened portion
80 Liquid drop
90 Surface
100 Nanoparticle
110 Stamp
115 Bar-like structure
120 Fluid component
130 Receiving portion
140 Liquid
150 Channel
160 Capacitor or electrode structure
170, 180 Capacitor area
U Electrical voltage
200 Optical component
210 Nanoparticle or micrometer-sized particle
220 Optical grating
300 Arrangement
310 Polymer molecule
320 Electron
400 Arrangement
410 Polymer material
420 Outer surface

The invention claimed is:

1. An arrangement comprising a carrier, a layer and a material enclosed between the carrier and the layer,
    wherein the layer is formed by a single two-dimensionally crosslinked layer or by a plurality of two-dimensionally crosslinked layers which are indirectly or directly connected to one another;
    wherein the two-dimensionally crosslinked layer or the two-dimensionally crosslinked layers are impermeable to gases and liquids, are thinner than 10 atom layers and are atomically smooth, and
    the enclosed material comprises biological material or consists thereof.

2. The arrangement as claimed in claim 1, wherein
    the biological material comprises biomolecules (e.g. RNA, DNA), cells, viruses, bacteria, spores and/or prions or consists thereof.

3. The arrangement as claimed in claim 1, wherein the surface of the carrier is locally changed, for example roughened, structured and/or functionalized.

4. The arrangement as claimed in claim 1, wherein the two-dimensionally crosslinked layer is a graphene layer or a graphene-like layer or the two-dimensionally crosslinked layers are graphene layers or graphene-like layers.

5. The arrangement as claimed in claim 1, wherein the enclosed material is protected by the crosslinked layers.

6. The arrangement as claimed in claim 1, wherein the enclosed material comprises a liquid (30, 140) or consists thereof.

7. The arrangement as claimed in claim 1, wherein the surface (90) of the carrier is formed by a silicate layer.

8. An arrangement comprising a carrier, a layer and a material enclosed between the carrier and the layer,
    wherein the layer is formed by a single two-dimensionally crosslinked layer or by a plurality of two-dimensionally crosslinked layers which are indirectly or directly connected to one another;
    wherein the arrangement comprises a manipulation device, which is suitable for acting on the carrier, the layer and/or the material enclosed between the carrier and the layer, preferably mechanically, electromagnetically, thermally and/or chemically;
    wherein the manipulation device is suitable for joining material portions which are separate from one another and are enclosed between the carrier and the layer and for forming a cohesive material portion using the material portions which are separate from one another, and/or is suitable for separating a cohesive material portion which is enclosed between the carrier and the layer.

9. The arrangement as claimed in claim 8, wherein the arrangement forms a pump or a component part of a pump.

10. The arrangement as claimed in claim 8, wherein the arrangement comprises a capacitor structure (160) with two capacitor areas (170, 180), of which one is formed by the two-dimensionally crosslinked layer or by at least one of the two-dimensionally crosslinked layers.

11. The arrangement as claimed in claim 8, wherein the enclosed material comprises at least one nanoparticle (210), at least one micrometer-sized particle, at least one single molecule and/or polymer material or consists thereof.

12. The arrangement as claimed in claim 8, wherein the enclosed material forms a component part of an optical or electronic component.

13. A method for operating the arrangement as claimed in claim 8, wherein
    the manipulation device is used to join material portions which are separate from one another and are enclosed between the carrier and the layer and to form a cohesive material portion using the material portions which are separate from one another and/or to separate a cohesive material portion which is enclosed between the carrier and the layer.

14. A method for producing an arrangement, in which method a layer is applied to a carrier, wherein material is enclosed between the layer and the carrier at least in parts,
wherein the layer is formed from at least one two-dimensionally crosslinked layer;
wherein the distribution of the material is changed by means of the action of a mechanical, an electrostatic and/or magnetic force after it has been enclosed between the carrier and the at least one two-dimensionally crosslinked layer.

15. The method as claimed in claim 14, wherein
before the material to be enclosed is applied, the surface of the carrier is locally changed, for example roughened, structured and/or functionalized.

\* \* \* \* \*